United States Patent [19]

Hauser, Jr.

[11] 4,433,616
[45] Feb. 28, 1984

[54] PISTON ASSEMBLY FOR AN INTERNAL COMBUSTION ENGINE

[75] Inventor: Herbert J. Hauser, Jr., Waterloo, Iowa

[73] Assignee: Deere & Company, Moline, Ill.

[21] Appl. No.: 280,395

[22] Filed: Jul. 6, 1981

[51] Int. Cl.³ .............................................. F16J 1/14
[52] U.S. Cl. ...................................... 92/190; 92/189; 92/212; 92/220
[58] Field of Search ................ 92/176, 189, 187, 190, 92/212, 220, 257, 255, 186, 213, 224, 248; 123/193 P, 41.35, 41.39; 411/427

[56] References Cited

U.S. PATENT DOCUMENTS

| | | | |
|---|---|---|---|
| 1,686,357 | 10/1928 | Williams | 92/212 |
| 1,763,625 | 6/1930 | Mellor | 92/189 |
| 1,898,872 | 2/1933 | Evanoff et al. | 92/186 |
| 2,317,429 | 4/1943 | Armstrong | 92/189 |
| 2,478,294 | 8/1949 | Madsen | 92/176 |
| 2,648,248 | 8/1953 | Cederquist | 411/427 |
| 2,671,704 | 3/1954 | Brown | 92/189 |
| 2,840,427 | 6/1958 | Dolza | 92/176 |
| 3,408,995 | 11/1968 | Johnson | 123/191 |
| 4,114,519 | 9/1978 | Speaight | 92/221 |
| 4,242,948 | 1/1981 | Stang et al. | 92/176 |
| 4,245,611 | 1/1981 | Mitchell et al. | 123/669 |
| 4,372,179 | 2/1983 | Dolenc et al. | 123/193 P |

Primary Examiner—Robert E. Garrett
Assistant Examiner—Richard L. Klein

[57] ABSTRACT

A piston assembly for an internal combustion engine having a rotatable crankshaft. The piston assembly includes a piston body having a concave configured cavity formed in one end and a plurality of recesses formed in its outer circumference. The piston body is connected to the crankshaft by a connecting rod having a spherical end which mates with the concave configured cavity. The connecting rod is secured to the piston body by an annular skirt which is attached to the piston body by a plurality of bolts. The bolts thread into retainers which are positioned in the recesses formed in the piston body.

11 Claims, 4 Drawing Figures

PISTON ASSEMBLY FOR AN INTERNAL COMBUSTION ENGINE

BACKGROUND OF THE INVENTION

1. Field of the Invention

This invention relates to a piston assembly for an internal combustion engine having a rotatable crankshaft and more particularly to a piston assembly utilizing heat insulated components.

2. Description of the Prior Art

There is currently an industry trend to develop internal combustion engines which can operate at higher combustion temperatures and pressures. One means for obtaining such higher values is to use new heat insulated materials, such as ceramics. Although the ceramic materials exhibit superb heat insulating qualities, they tend to be brittle and stress sensitive and are susceptible to cracking when used in an operating engine. This is especially true when the piston body is primarily constructed from ceramic. Various attempts to use ceramics in pistons have been primarily limited to ceramic inserts and ceramic crowns attached to metallic carriers. Such is taught in U.S. Pat. No. 4,245,611 issued to Mitchell et al in January 1981 and in U.S. Pat. No. 4,114,519 issued to Speaight in September 1978. Even in these designs, there is a likelihood that peak stress loading and unsymmetrical stress patterns will develop across the surface of the piston. Such stress patterns are partially caused by the use of a conventional piston pin.

Now a piston assembly has been invented which will provide a symmetrical stress pattern across the surface of the piston and will permit a greater percentage of the piston to be constructed of a ceramic material.

SUMMARY OF THE INVENTION

Briefly, this invention relates to a piston assembly for an internal combustion engine having a rotatable crankshaft. The piston assembly includes a piston body, preferably made substantially from ceramic which has a concave configured cavity formed in one end. A connecting rod, attached at one end to the cranshaft, has a second spherical end which is matable in the cavity of the piston body. This spherical end has a slot formed in its outer surface such that the centerline of the slot and the centerline of the piston body lies in a plane which is perpendicular to the centerline of the crankshaft. The spherical end of the connecting rod is retained in the cavity by an annular skirt which surrounds the spherical end and is attached to the piston body. A retainer positioned in the piston body and having a projecting tongue engages the slot when the piston assembly is attached together. The tongue and slot prevent rotational movement of the piston body on the connecting rod while allowing for limited rocking movement of the connecting rod caused by rotation of the crankshaft. And the mating of the spherical end in the concave configured cavity of the piston body allows for a symmetrical stress pattern on the piston along the longitudinal axis of the cylinder thereby decreasing the likelihood of failure of the ceramic material.

The piston body can be totally constructed of ceramic or just have a ceramic crown. For each design, attachment means are described which compensate for the weakness of the ceramic material.

The general object of this invention is to provide a piston assembly for an internal combustion engine having a rotatable crankshaft and utilizing heat insulated components which are stress sensitive. A more specific object of this invention is to provide a piston assembly which permits the piston body to be constructed from a greater percentage of a heat insulated material, such as ceramic.

Another object of this invention is to provide a piston assembly which will prevent the piston body from rotating on the connecting rod while permitting limited rocking movement of the connecting rod caused by rotation of the crankshaft.

Still another object of this invention is to provide a piston assembly having a unique attachment means for joining the connecting rod to the piston body.

A further object of this invention is to provide a piston assembly having a ceramic crown and a metallic carrier wherein the crown is bolted to the carrier such that the bending stress forces acting on the crown during engine operation are reduced.

Other objects and advantages of the present invention will become more apparent to those skilled in the art in view of the following description and the accompanying drawings.

DETAILED DESCRIPTION OF THE PREFERRED EMBODIMENT

Figure 1:
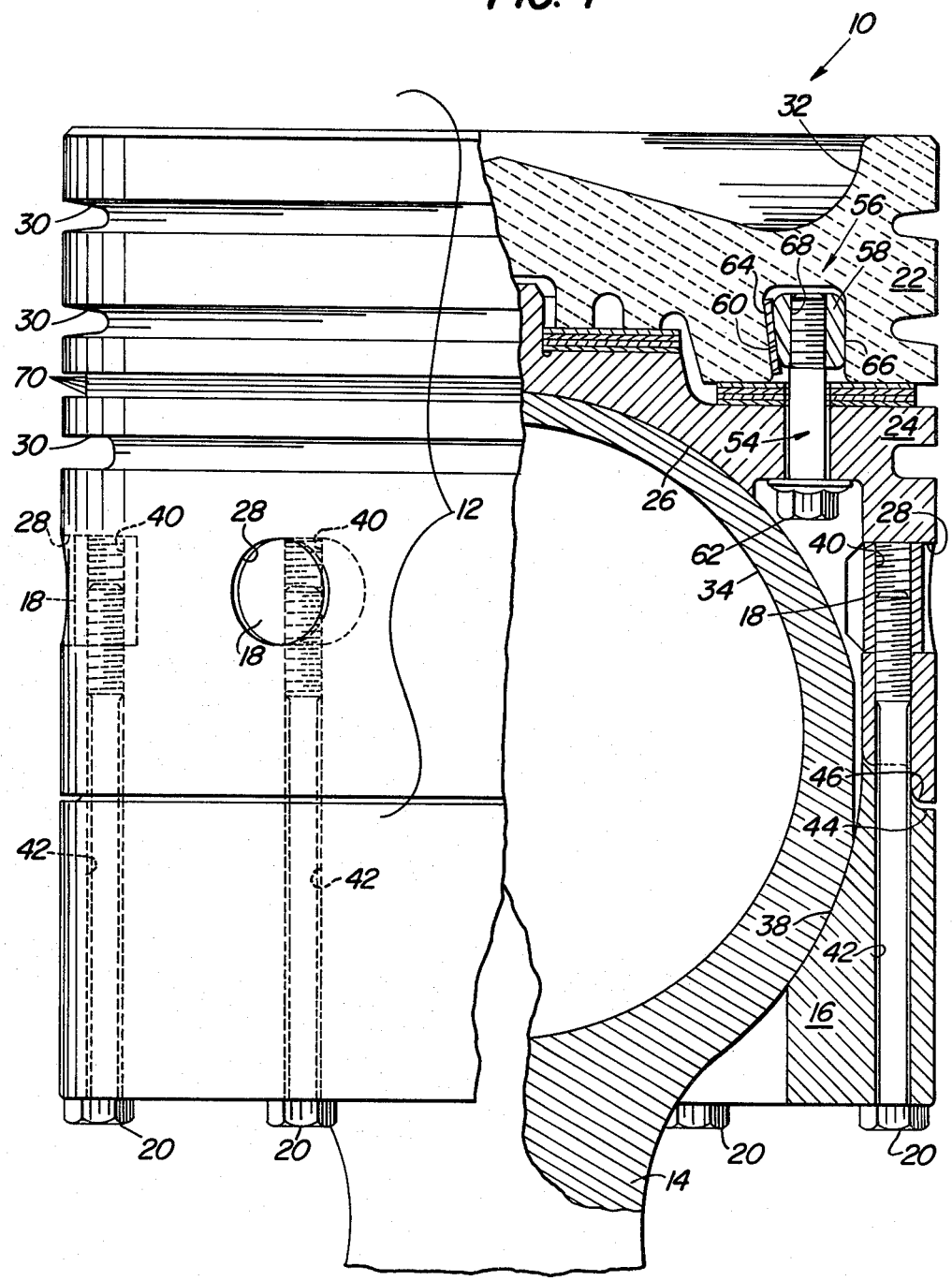
FIG. 1 is a partial sectional view of one embodiment of the piston assembly showing a heat insulated crown and a metallic carrier attached to a connecting rod having a spherical end.
Figures 2, 3:
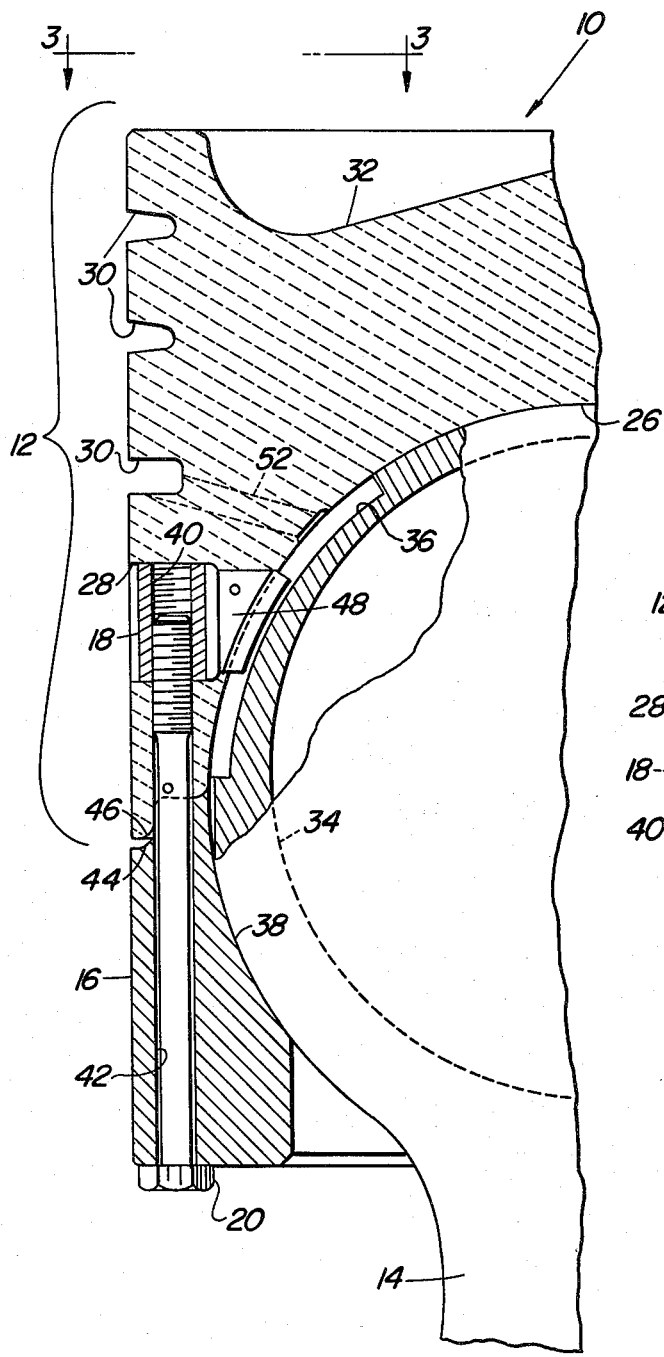
FIG. 2 is a sectional view of a second embodiment of the piston assembly showing a heat insulated piston body with a retainer for preventing rotational movement of the piston body on the spherical end of the connecting rod.
FIG. 3 is a top view of FIG. 2 along the line 3—3.
Figure 4:
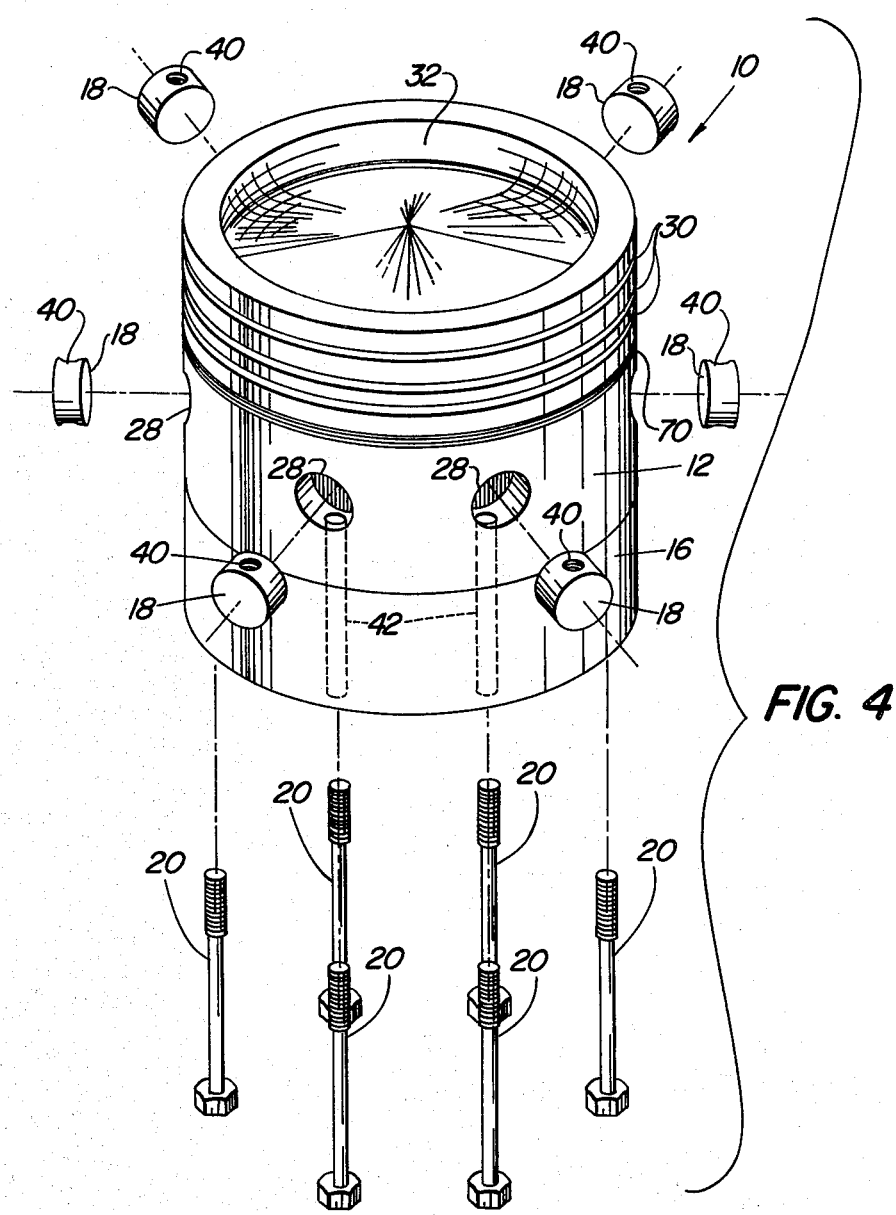
FIG. 4 is a perspective, partially exploded view of the piston assembly showing how the attachment means are assembled.

Referring now to FIGS. 1-4, a piston assembly 10 is shown for use in an internal combustion engine having at least one cylinder. The piston assembly 10 is connected to a conventional crankshaft by a connecting link for reciprocative movement within the cylinder. The piston assembly 10 includes a piston body 12, a connecting rod 14, an annular skirt 16, a plurality of retainers 18 and attachment means 20. The piston body 12 is constructed of a heat insulated or heat resistant material. Example of such materials include ceramics, such as zirconia, silicon carbides and silicon nitrides and also cast iron having a high nickel content. The piston body 12 is cylindrical in shape and can be either constructed from a single type of material as shown in FIG. 2 or can be composite, as shown in FIG. 1, having a heat insulated crown 22 attached to a metallic carrier 24. In either case, the piston body 12 has a concave configured cavity 26 formed in one end and has a plurality of cylindrically shaped recesses 28 formed in its outer circumference, preferably all located in one plane. The piston body 12 can also contain one or more circular piston grooves 30 which serve to retain piston rings in the conventional manner as well as a combustion chamber 32 in its second end.

The concave configured cavity 26 is designed to mate with a spherical end 34 on one end of the connecting rod 14. The spherically shaped surface contact between the piston body 12 and the connecting rod 14 provides for a symmetrical stress pattern over the surface of the piston body 12. This symmetrical stress pattern reduces the likelihood of peak stress forces and prolongs the life of the piston assembly during normal engine operation. The spherical end 34 can contain an elongated arcuate slot 36 in its outer periphery as clearly shown in FIG. 2. This slot is formed so as to have its centerline and the centerline of the piston body 12, lying in a common plane which is perpendicular to the centerline of the crankshaft. It should be noted that the connecting rod 14 is attached at its second end to a crankshaft in a conventional manner such that the connecting rod 14 is normally perpendicularly aligned to the crankshaft. The purpose of the slot will be explained shortly.

The spherical end 34 of the connecting rod is sandwiched between the piston body and the annular skirt 16. The skirt 16 is a hollow member having an arcuately shaped inner surface 38 which surrounds and engages with the spherical end 34 of the connecting rod 14. The skirt 16 is attached to the piston body 12 by the retainers 18 and the attachment means 20 such that the connecting rod 14 is physically retained in the concave configured cavity 26. The retainers 18, of which there are a plurality, preferably at least three and more preferably six, are disk-shaped and each contains a threaded aperture 40. The retainers 18 are positioned in the cylindrical recesses 28 of the piston body 12. Preferably, the retainers 18 are metallic nut shaped members, which when inserted into the recesses 28, will resist any rotational movement so that a fastener can be threaded into them without the need of holding them fast with a wrench. This feature provides a means for joining a piston body 12 made of a ceramic to a metallic skirt 16 without the worry of subjecting the ceramic to high stress points. The retainers 18 are also useful when the piston body 12 is constructed of a light metal, such as aluminum, which cannot hold threads very good, i.e. due to its softness and temperature coefficient. Threaded into the retainers 18 are an equal number of attachment means 20, such as bolts, which pass through bolt holes 42 formed in the annular skirt 16 and in the piston body 12. The retainers 18 and the attachment means 20 permit the skirt 16 to be securely joined to a heat insulated or heat resistant piston body material without the fear of cracking the later. It should also be noted that the top surface 44 of the skirt 16 and the bottom surface 46 of the piston body 12 are curved so as to allow the two parts to nest together. This nesting feature ensures that the outer circumferences of the piston body 12 and the skirt 16 are arranged inline.

Referring to FIGS. 2 and 3, one of the retainers 18 includes a projecting tongue 48 which passes through an aperture 50 formed in the piston body 12 and engages the slot 36. The projecting tongue 48 cooperates with the slot 36 to prevent rotational movement of the piston body 12 on the spherical end 34 of the connecting rod 14 while permitting rocking movement of the spherical end 34 of the connecting rod 14 about its longitudinal axis. The limitation of rotational movement of the piston body 12 on the connecting rod 14 becomes important in cylinders where the inlet and exhaust valves are so arranged with the combustion chamber 32 that any rotational movement of the piston body 12 would cause interference problems. The projecting tongue 48 can be integral with one of the retainers 18 as shown or can be constructed as two separate members.

As shown in FIG. 2, an optional oil passage 52 can be formed in the piston body 12 communicating between its outer circumference and the concave configured cavity 26 to provide lubrication to the joint formed with the spherical end 34 of the connecting rod 14.

Again referring to FIG. 1 wherein the piston body 12 is formed of a disk shaped ceramic crown 22 and a metallic carrier 24, a fastening mechanism 54 is shown which will decrease the bending and arching of the crown 22 away from the carrier 24 during engine operation. The fastening mechanism 54 includes a circular groove 56 coaxially formed in a face surface of the crown 22, a ring 58 positioned in the groove 56, a shim 60 positioned adjacent to the ring 58 in the groove 56, and a plurality of bolts 62 threaded into the ring 58 so as to secure the crown 22 to the carrier 24. The circular groove 56 is trapezoidal in cross-sectional shape with a non-parallel first and second circumferential surfaces 64 and 66. The first circumferential surface 64 is inclined upward at an acute angle from the base to the mouth of the groove 56 while the second circumferential surface 66 is perpendicularly aligned to the base of the groove 56. The ring 58, which is situated in the groove 56, has a circumferential surface aligned approximately parallel to the first circumferential surface of the groove 56 and has an exposed surface containing a plurality of threaded apertures 68 located in a circular pattern. Positioned between the ring 58 and the first circumferential surface 64 of the groove 56 in the ring shaped shim 60 having a rectangular cross-sectional shape. As the bolts 62 are threaded into the ring 58, the ring 58 is urged towards the mouth of the groove 56 and the shim 60 serves to prevent its outward movement. The more the ring 58 is pulled towards the mouth of the groove, the more secure the attachment becomes.

The positive locking effect of this fastening mechanism 54 about a 360 degree arc on a face surface of the crown 22 enables the crown to resist buckling from the adjoining surface of the carrier 24.

Spacers 70 can be placed between the crown 22 and the carrier 24 to act as a thermal barrier therebetween and also as shims to assist in assembling the piston body 12 so as to obtain an exact overall length. The composition of the spacers 70 can vary depending upon the operating temperature of the piston assembly in the engine and also as to the composition of the crown 22 and the carrier 24. A steel spacer is generally useful for most applications.

While this invention has been described in conjunction with a couple specific embodiments, it is to be understood that many alternatives, modifications and variations will be apparent to those skilled in the art in light of the aforegoing description. Accordingly, it is intended to embrace all such alternatives, modifications, and variations which fall within the spirit and scope of the appended claims.

I claim:
1. A piston assembly for an internal combustion engine having a rotatable crankshaft, said piston assembly comprising:
(a) a piston body having a concave configured cavity formed in one end and having a plurality of recesses formed in its outer circumference which communicate with said concave configured cavity;
(b) a connecting rod attached at one end to said crankshaft and having a second spherical end matable in said concave configured cavity of said piston body;

(c) a hollow annular skirt having an arcuately shaped inner surface engageable with said spherical end of said connecting rod;
(d) a plurality of retainers positioned in said recesses of said piston body; and
(e) attaching means for joining said skirt to said piston body, said attaching means including a plurality of fasteners passing through said skirt and into said retainers.

2. The piston assembly of claim 1 wherein said retainers are threaded disk-shaped members and said recesses are cylindrically shaped.

3. The piston assembly of claim 1 wherein said threaded disk-shaped members are nuts equally spaced in a plane about the circumferential surface of said piston body.

4. The piston assembly of claim 1 wherein said spherical end of said connecting rod has a slot formed in its outer periphery with its centerline and the centerline of said piston body lying in a common plane which is perpendicular to the centerline of said crankshaft and wherein one of said retainers includes a projecting tongue passing through said piston body and engages said slot.

5. The piston assembly of claim 1 wherein said piston body is completely ceramic.

6. A piston assembly for an internal combustion engine having a rotatable crankshaft, said piston assembly comprising:
(a) a piston body having a heat insulated crown attached to one end and having a concave configured cavity formed in a second end, said piston body further having a plurality of recesses formed in its outer circumference which communicates with said concave configured cavity;
(b) a connecting rod attached at one end to said crankshaft and having a second spherical end mateable with said concave configured cavity formed in said piston body, said spherical end having a slot formed in its outer surface wherein the centerline of said slot and the centerline of said piston body lies in a common plane which is prependicular to the centerline of said crankshaft;
(c) a hollow annular skirt having an arcuately shaped inner surface engageable with the outer surface of said spherical end of said connecting rod;
(d) a plurality of retainers positioned in said recesses of said piston body;
(e) attaching means for joining said skirt to said piston body, said attaching means including a plurality of fasteners passing through said skirt and into said retainers; and
(f) means for limiting movement of said piston body on said spherical end of said connecting rod, said means including a projecting tongue formed on one of said retainers which engages said slot.

7. The piston assembly of claim 6 wherein said heat insulated crown is ceramic.

8. The piston assembly of claim 6 wherein said attachment means include threaded disk-shaped retainers contained in recesses formed in said piston body and bolts passing through said skirt and said piston body threadably received in said retainers.

9. A piston assembly for an internal combustion engine having a rotatable crankshaft, said piston assembly comprising:
(a) a disk-shaped, heat-insulated crown secured to a metallic carrier by a fastening mechanism, said fastening mechanism including a circular groove coaxially formed in a face surface of said disk-shaped crown, said groove having a trapezoidal cross-sectional configuration with non-parallel first and second circumferential surfaces, said first circumferential surface inclined upward at an acute angle from base of said groove to mouth of said groove, and said second circumferential surface perpendicularly aligned to the base of said groove, a ring positioned in said circular groove having a circumferential surface aligned approximately parallel to the first circumferential surface of said groove and having an exposed surface containing a plurality of threaded apertures located in a circular pattern, a ring shaped shim having a rectangular cross-sectional shape positioned between said inclined circumferential surfaces of said groove and said ring, and a plurality of bolts passing through said carrier and engageable in said threaded apertures of said ring for securely attaching said crown and carrier together, said carrier further having a concave configured cavity formed therein and a plurality of recesses formed in the outer circumference thereof which communicate with said concave configured cavity;
(b) a connecting rod attached at one end to said crankshaft and having a second spherical end mateable in said concave configured cavity, said spherical end having a slot formed in its outer periphery wherein the centerline of said slot and the centerline of said carrier lies in a common plane which is perpendicular to the centerline of said crankshaft;
(c) a hollow annular skirt having an arcuately shaped inner surface engageable with said spherical end of said connecting rod;
(d) attaching means for joining said skirt to said carrier thereby retaining said spherical end of said connecting rod in said concave configured cavity; and
(e) a retainer positioned within said carrier having a projecting tongue engaging said slot to prevent rotational movement of said spherical end of said connecting rod about its longitudinal axis while permitting rocking movement of said spherical end of said connecting rod about its longitudinal axis.

10. The piston assembly of claim 9 wherein said heat-insulated crown is ceramic.

11. The piston assembly of claim 9 wherein spacers are positioned between the crown and the carrier to reduce thermal conductivity therebetween.

* * * * *